US006814472B2

(12) United States Patent
D'Andrea, Jr. et al.

(10) Patent No.: US 6,814,472 B2
(45) Date of Patent: Nov. 9, 2004

(54) COMPUTER EXPANSION SLOT COVER BASED ILLUMINATION DEVICE

(76) Inventors: Frank G. D'Andrea, Jr., 3328 NW. 15th Ter., Pompano Beach, FL (US) 33064; Frank G. D'Andrea, III, 1003 Bradley Ct., Kodak, TN (US) 37764

( * ) Notice: Subject to any disclaimer, the term of this patent is extended or adjusted under 35 U.S.C. 154(b) by 0 days.

(21) Appl. No.: 10/039,555

(22) Filed: Jan. 8, 2002

(65) Prior Publication Data

US 2003/0128540 A1 Jul. 10, 2003

(51) Int. Cl.[7] .................................................. B60Q 1/24

(52) U.S. Cl. ....................... 362/371; 362/190; 362/195; 362/253; 362/371

(58) Field of Search .............................. 362/23, 29, 85, 362/86, 89, 97, 109, 127, 133, 154, 156, 157, 190, 191, 194–198, 200, 205, 206, 253, 362, 364, 365, 368, 370, 371, 418, 419, 429, 430, 458, 33; 361/683–686

(56) References Cited

U.S. PATENT DOCUMENTS

| | | | | | |
|---|---|---|---|---|---|
| 5,203,622 | A | * | 4/1993 | Sottile | 362/109 |
| 5,615,945 | A | * | 4/1997 | Tseng | 362/226 |
| 5,791,763 | A | * | 8/1998 | Kam-Hoi | 362/183 |
| 6,161,944 | A | * | 12/2000 | Leman | 362/276 |
| 6,386,724 | B2 | * | 5/2002 | Naghi | 362/85 |
| 6,466,434 | B1 | * | 10/2002 | Tsai | 361/685 |
| 6,523,967 | B2 | * | 2/2003 | Naghi et al. | 362/109 |
| 6,575,593 | B2 | * | 6/2003 | Krietzman | 362/199 |

* cited by examiner

*Primary Examiner*—Thomas M. Sember
*Assistant Examiner*—Ismael Negron
(74) *Attorney, Agent, or Firm*—Melvin K. Silverman; Yi Li

(57) ABSTRACT

A utility light for the illumination of the interior of the case of a CPU of a personal computer includes a bracket having the general geometry of an expansion slot cover bracket; batteries inclusive of a housing secured to one surface of the bracket; a flexible lamp neck having one end extending from the battery housing and in electrical communication with the batteries; a lamp in electrical communication with an opposite end of the lamp neck; and a switch in electrical communication with said batteries.

14 Claims, 7 Drawing Sheets

COMPUTER EXPANSION SLOT COVER BASED ILLUMINATION DEVICE

BACKGROUND OF THE INVENTION (a) Subject Area

The instant invention relates to means for the illumination of the interior of the case of a personal computer.

(b) Prior Art

As is well known to computer technicians as well as amateurs and others who undertake work upon the inside of their computer, a longstanding problem has been that of provision of sufficient light while working within the computer to sufficiently observe the components or area of interest. That is, while many small hand held lights are available, it, at present, is necessary to use one hand, or to have another person, hold a light while checking or working within the case of the computer. The invention address this long felt need in the art by providing a convenient and compact means predicated upon the existing structure and volume of the case of the CPU of a personal computer such that a light assembly is maintained as either a permanent or removable part of the interior of the computer case.

The inventors know of no prior art which utilizes an existing mechanical structure of the case of a computer base for securement of such a utility light.

SUMMARY OF THE INVENTION

A utility light for the illumination of the interior of the case of a CPU of a personal computer includes a bracket having the general geometry of an expansion slot cover bracket; battery means inclusive of a housing therefore secured to one surface of the bracket; a flexible lamp neck having one end extending from said battery housing and in electrical communication with said battery means; a lamp in electrical communication with an opposite end of the lamp neck; and a switch in electrical communication with said battery means.

The invention may also be expressed in terms of a method for providing illumination to the inside of a computer during periods of work upon the hardware thereof. This method includes the steps of removing a substantially planar expansion slot cover bracket from a complemental void space within a wall of the interior of the case of a CPU of the computer; and inserting into said space the combination of lamp means having, as a base thereof, a second and like bracket having a surface complemental to said void space of said computer wall.

It is accordingly an object of the present invention to provide an improved means for the illumination of the interior of a case or cover of the CPU of a personal computer.

It is another object to provide a utility light, formed of a small number of components, to provide to technicians and the like working within a computer with illumination means which do not require the use of either hand of the technician.

It is a further object of the invention to provide a method and device of the above type which is inexpensive, lightweight, easy to install, simple to use, and which utilizes a portion of the existing internal volume of the case of a personal computer.

The above and yet other objects and advantages of the present invention will become apparent from the hereinafter set forth Brief Description of the Drawings, detailed description of the invention and Claims appended herewith.

DETAILED DESCRIPTION OF THE INVENTION

Figure 1:
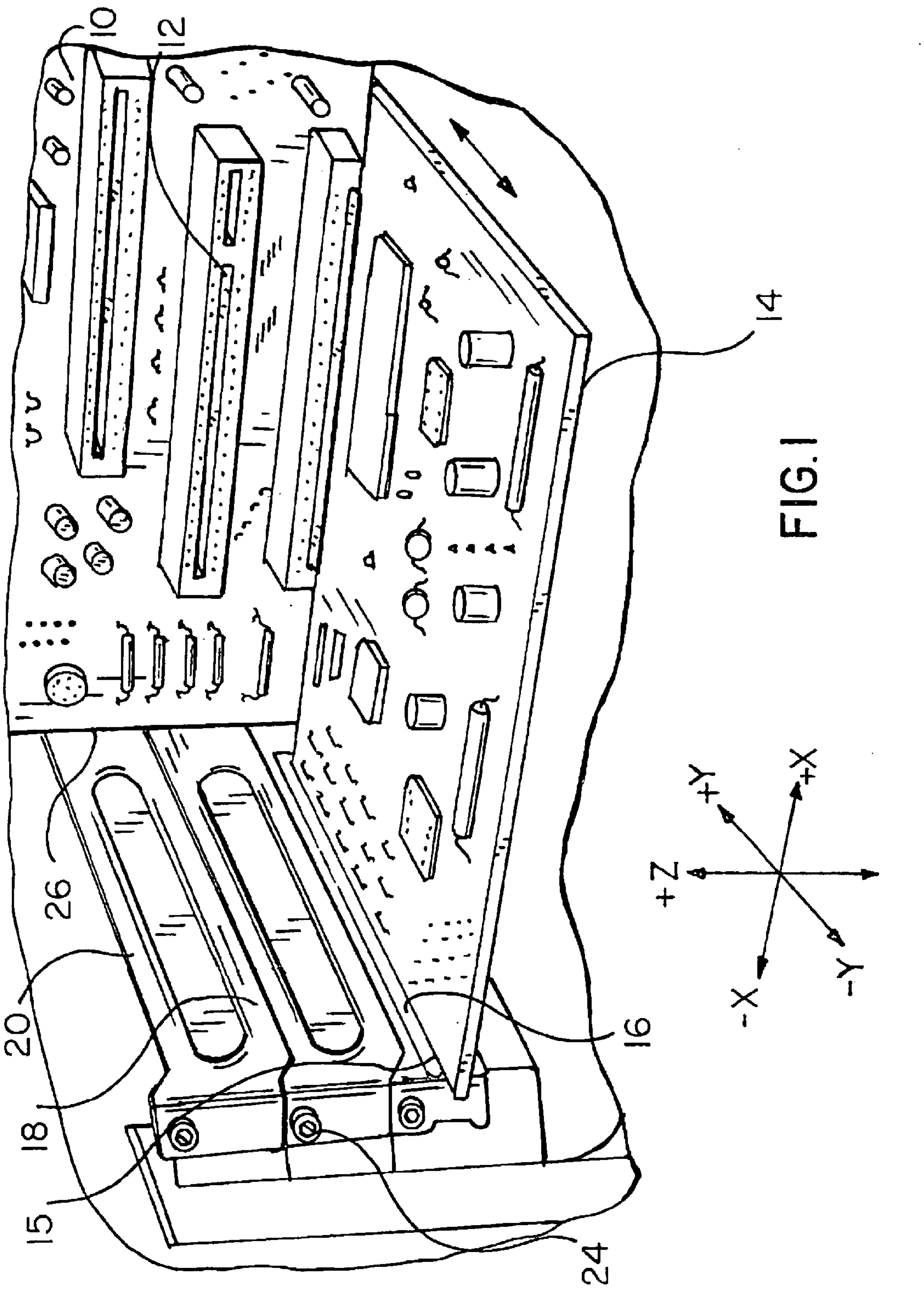
FIG. 1 is a rear perspective view of the inside of a tower-type personal computer after the case thereof has been removed, and showing the insertion of an expansion integrated circuit card into a motherboard.
Figure 2:
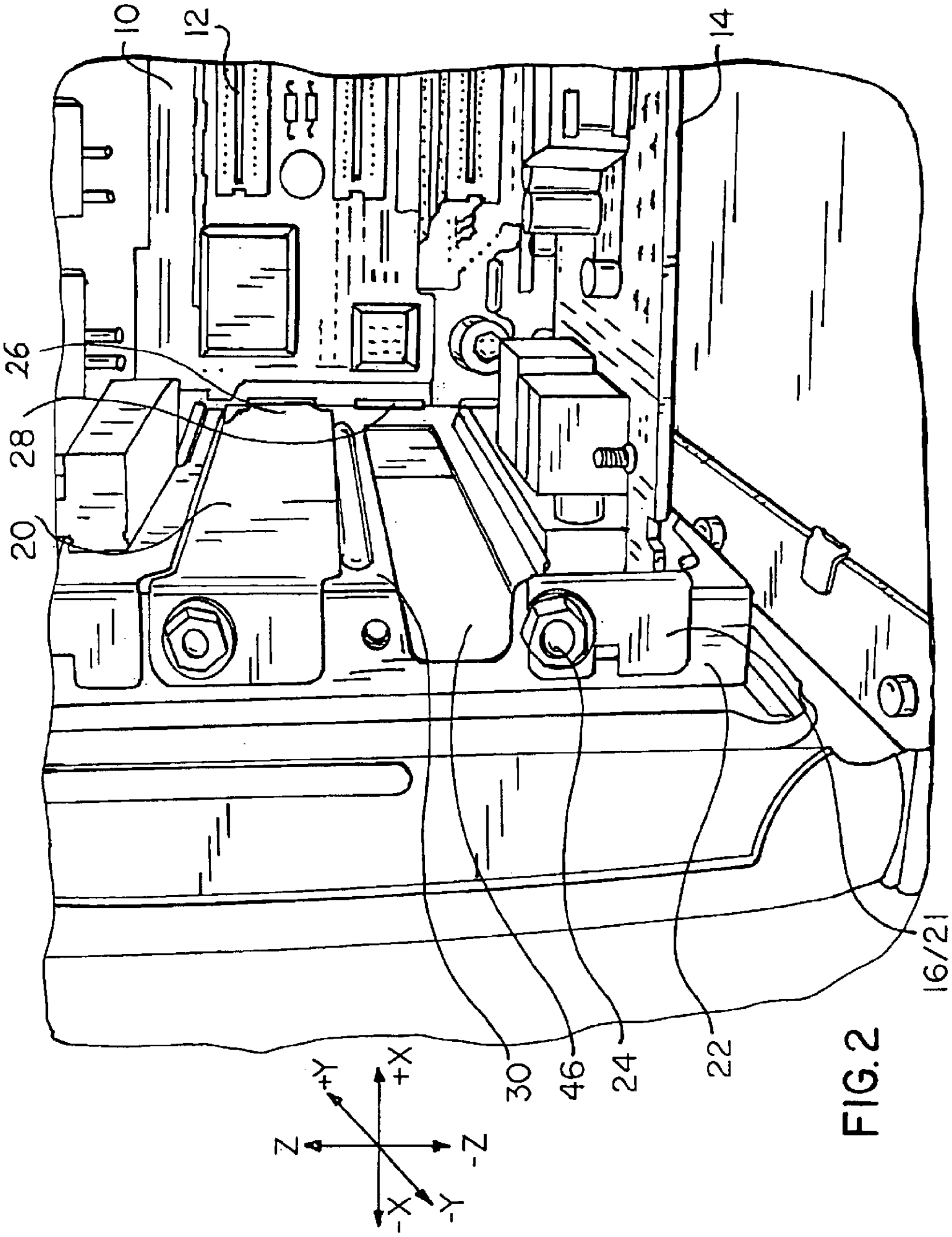
FIG. 2 is a perspective view showing the securement of the expansion card by an expansion slot cover (ESC) bracket.

With reference to the perspective views of FIGS. 1 and 2, there is shown the inside of the CPU of a tower-type personal computer after the cover thereof has been removed, this with reference to an arbitrary xyz coordinate axis in which the x-axis represents the left to right direction of the CPU, the y-axis the front to back direction, and the z-axis, the vertical direction or gravity vector.

There is more particularly shown in FIG. 1 a CPU mother board 10 having a plurality of horizontal expansion slots 12 into which a selectable integrated circuit ("IC") card 14 (in the nature of a music video or modem card) may be inserted. However, to provide necessary mechanical support to the IC expansion card 14, one must connect the left edge 15 thereof to a bracket 16 having the generalized geometry of an expansion slot cover (ESC) bracket in the manner shown in FIG. 2. As may be noted in the views of FIGS. 1 and 2, a personal computer is typically provided with additional ESC brackets 18 and 20 in addition to said bracket 16, this to provide for the addition of further IC expansion boards 14 to the CPU mother board 10, should one wish. Accordingly, a tower type computer, when newly purchased, will have either three or four ESC brackets along the x-axis side of the computer which brackets have a y-axis directionality and occupy a yz plane, this with the exception of transverse xz surface 21, at the −y end of the bracket. Thereby, said brackets are selectably used as mechanical support for a side of expansion cards such as said card 14.

As may be noted in FIG. 2, transverse surfaces 21 of said ESC brackets are secured to an xz surface 22 of the −x side of the inside of the computer by screw 24.

Figure 3:
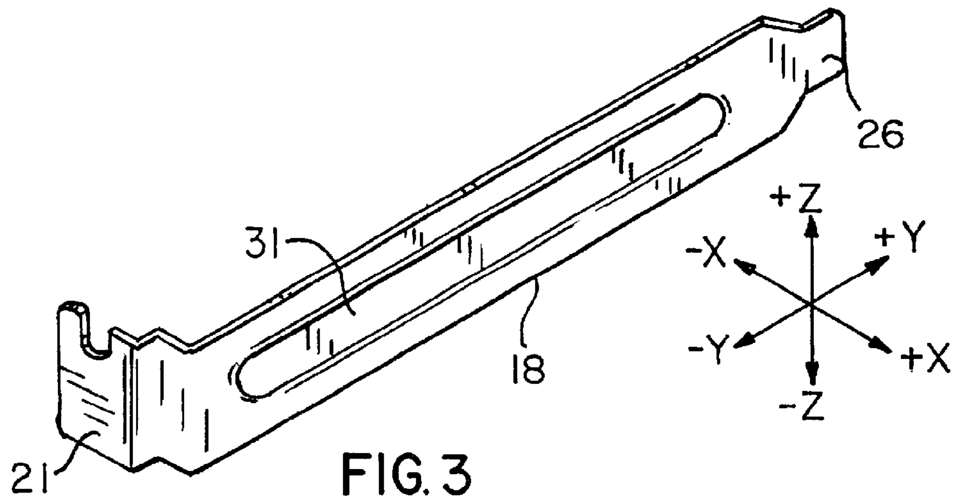
FIG. 3 is a perspective view of the ESC bracket as it appears upon removal from the computer.

With reference to the perspective view of FIG. 3 which shows ESC bracket 18 detached from the wall 30 of the computer, a second end thereof may be seen to define a tapered end 26, the function of which is to fit into a complemental slot 28 (see FIG. 2) within which said ESC brackets or equivalents 16/18/20 are normally secured. Recessed region 31 of each bracket may be complemental to void space 46 (described below) of said wall 30. It however is to be understood that recessed region 31 is not an essential part of the ESC type bracket for purposes of this invention.

Figure 4:
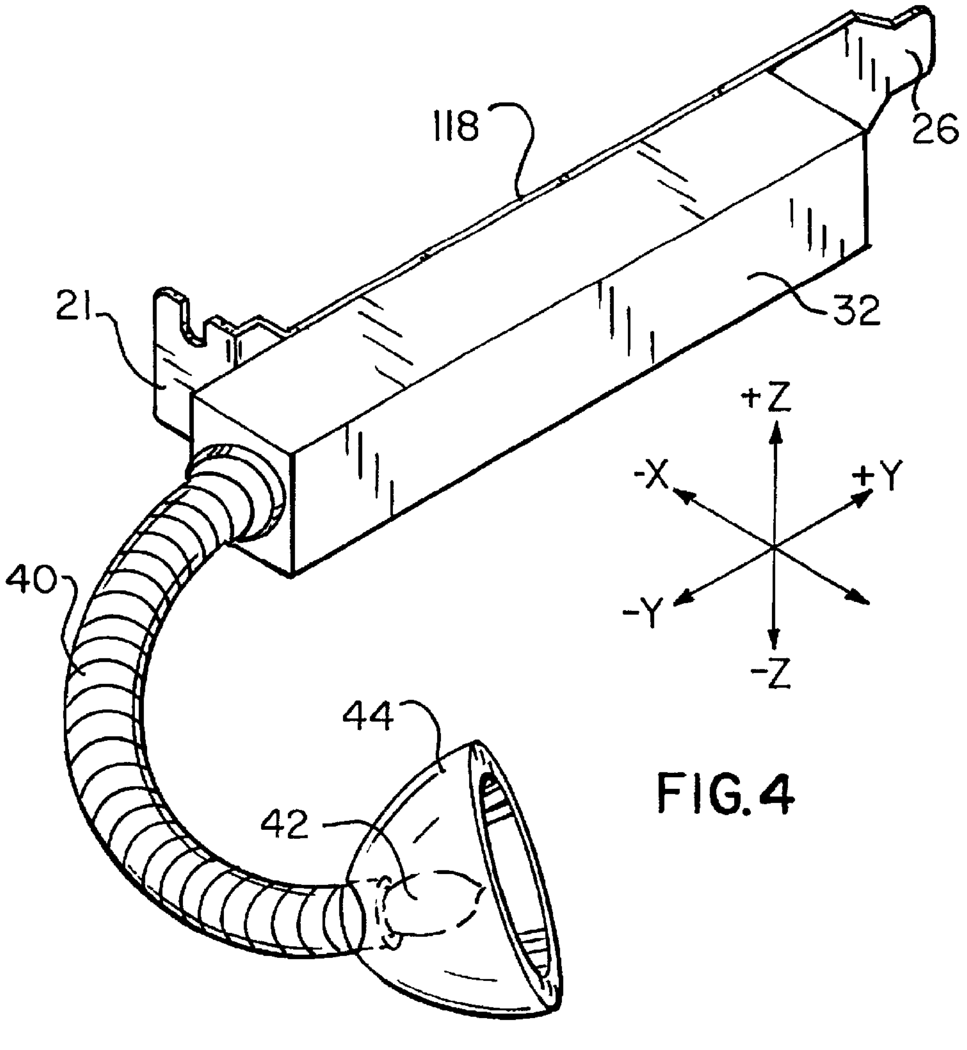
FIG. 4 is a perspective view of the inventive illumination device.
Figure 5:
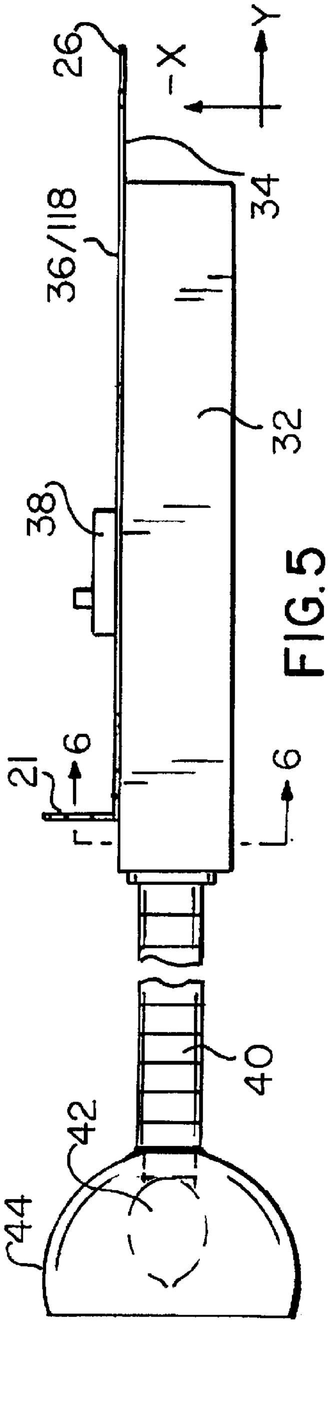
FIG. 5 is a top plan view of the device of FIG. 4.
Figure 7:
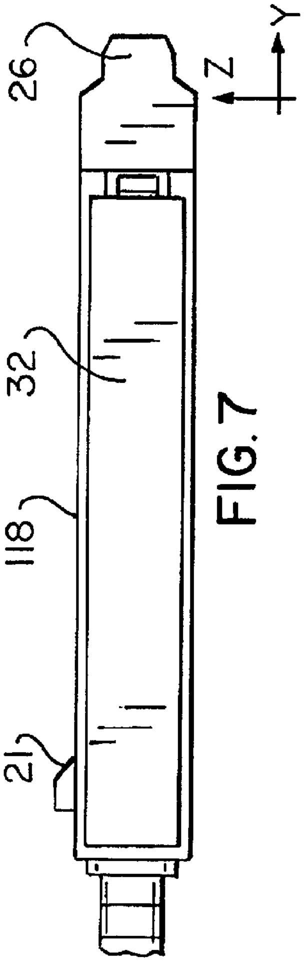
FIG. 7 is a side plan view of the inventive device of FIG. 4.
Figure 8:
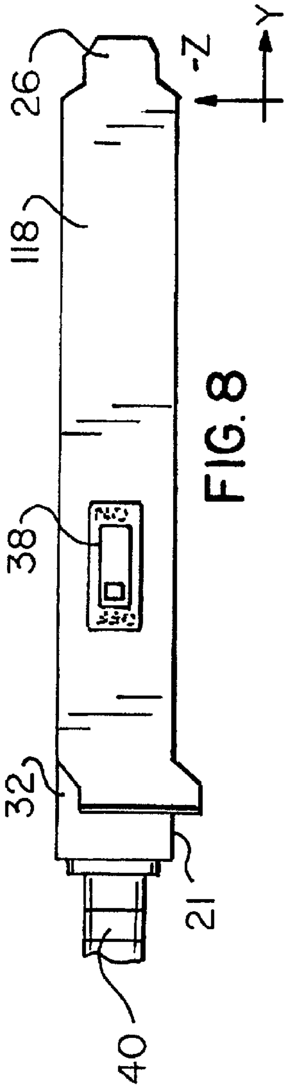
FIG. 8 is a reverse side plan view thereof.
Figure 6:
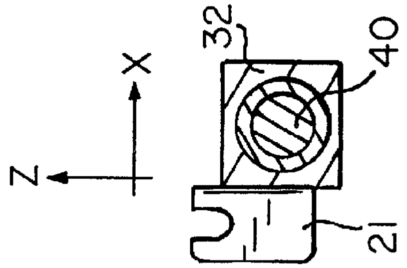
FIG. 6 is a radial cross-sectional view taken through Line 6—6 of FIG. 5.

With reference to the perspective view of FIG. 4 and top plan view of FIG. 5, the inventive device may be seen to include the combination of an ESC bracket 118 (or geometric equivalent thereof) and a battery pack 32 which is affixed to a side surface 34 thereof and generally within said recessed region 31. Upon opposite bracket surface 36 is disposed an on-off battery switch 38. Accordingly, an opening of appropriate size must be machined or molded through the surfaces 34/36 of said bracket 118 to accommodate said switch. Mechanically and electrically dependent from the rear −y end of battery pack 32 is a flexible shaft 40 having a length of up to 24 inches at the end of which is a lamp 42 surrounded by a heat shield 44. The structure of the lamp may be further appreciated with reference to the radial cross-sectional view of FIG. 6, and the x-axis front and rear side views of FIGS. 7 and 8.

While the present invention is intended as a self-contained art, the batteries of said battery pack may nonetheless be re-chargeable from a power supply of the computer if so provided by the computer manufacturer.

Figure 9:
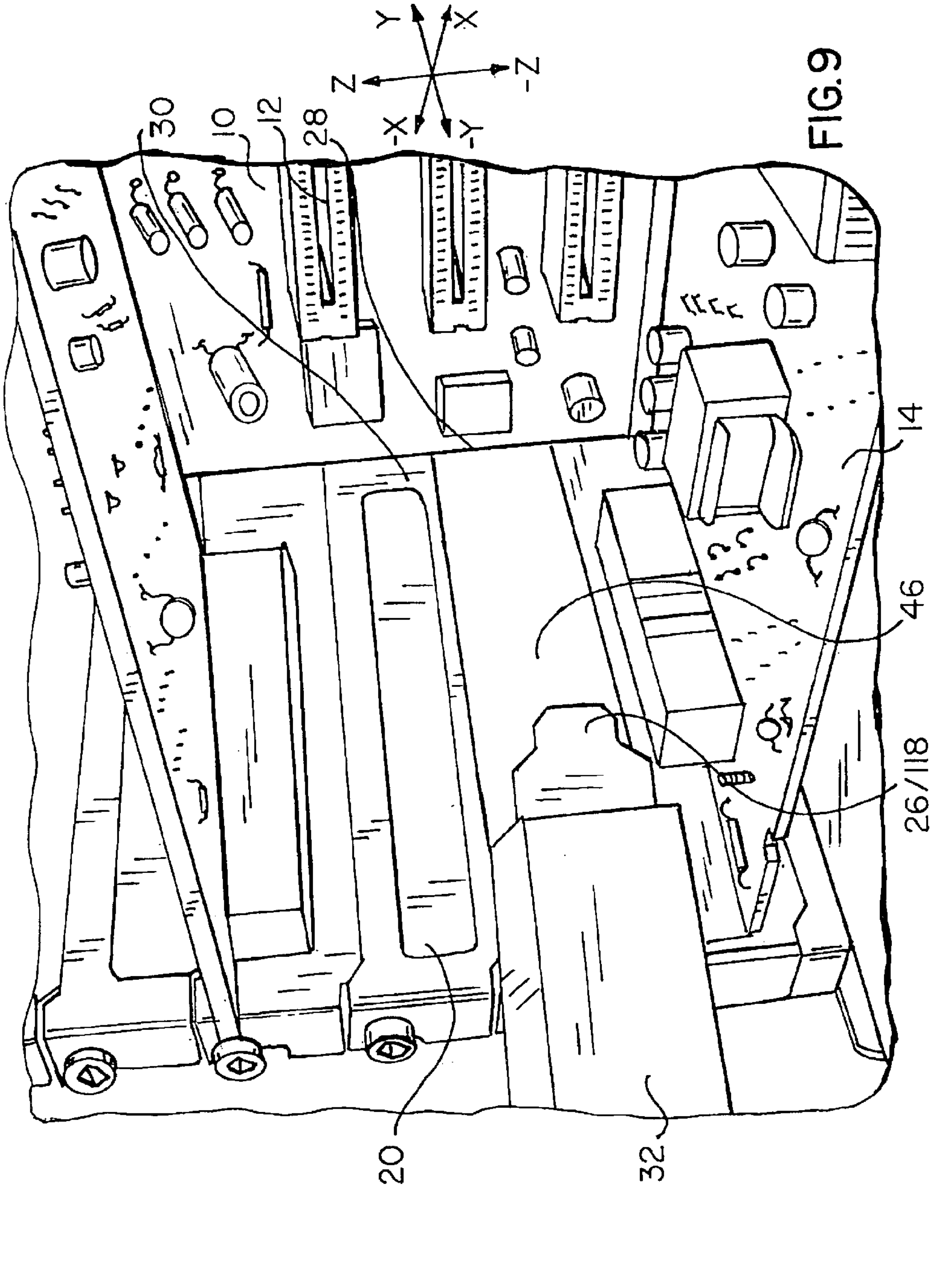
FIG. 9 is a perspective view, similar to that of FIG. 2, however, showing insertion of an ESC configured bracket including the inventive device in the ESC void space.
Figure 10:
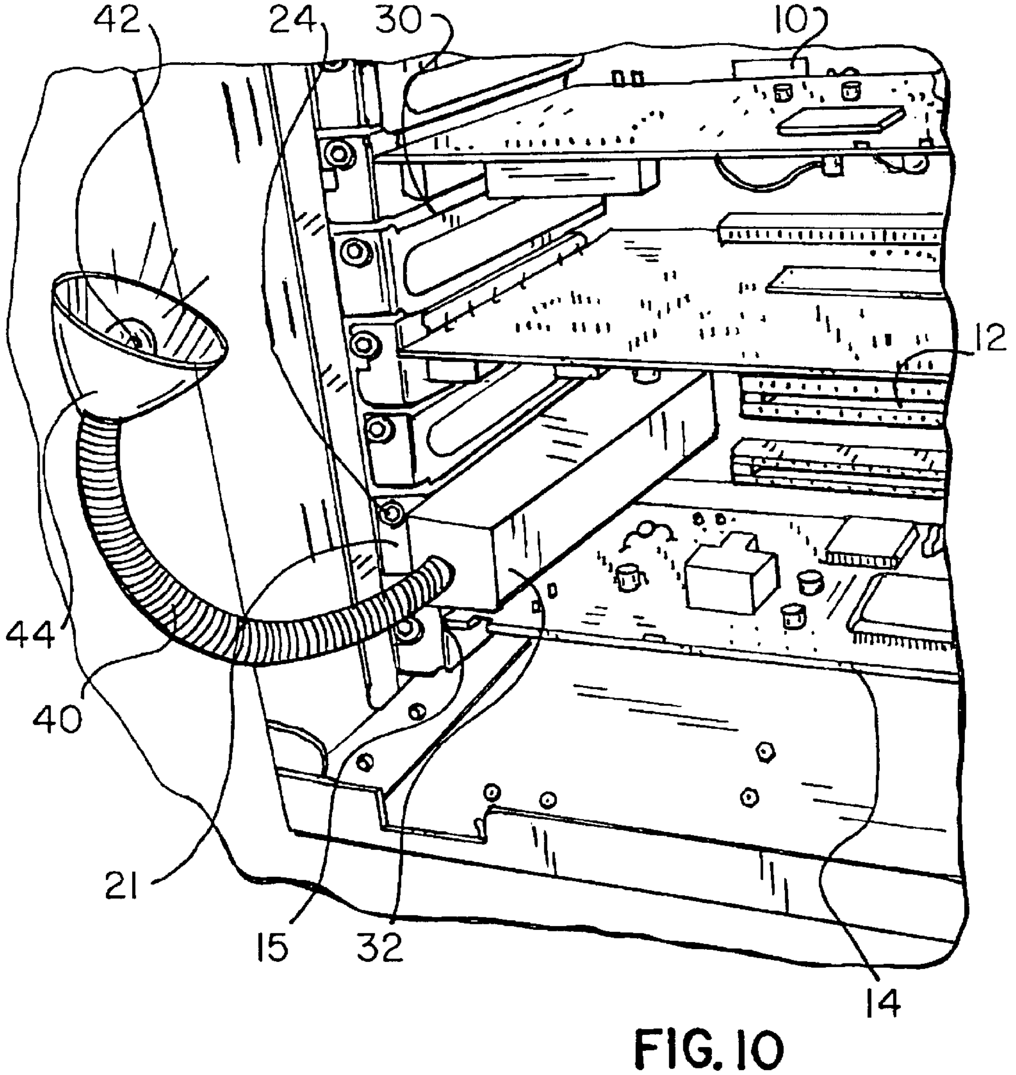
FIG. 10 is a perspective view showing the inventive device after insertion into the ESC void space of the inside of the case of the personal computer.
Figure 11:
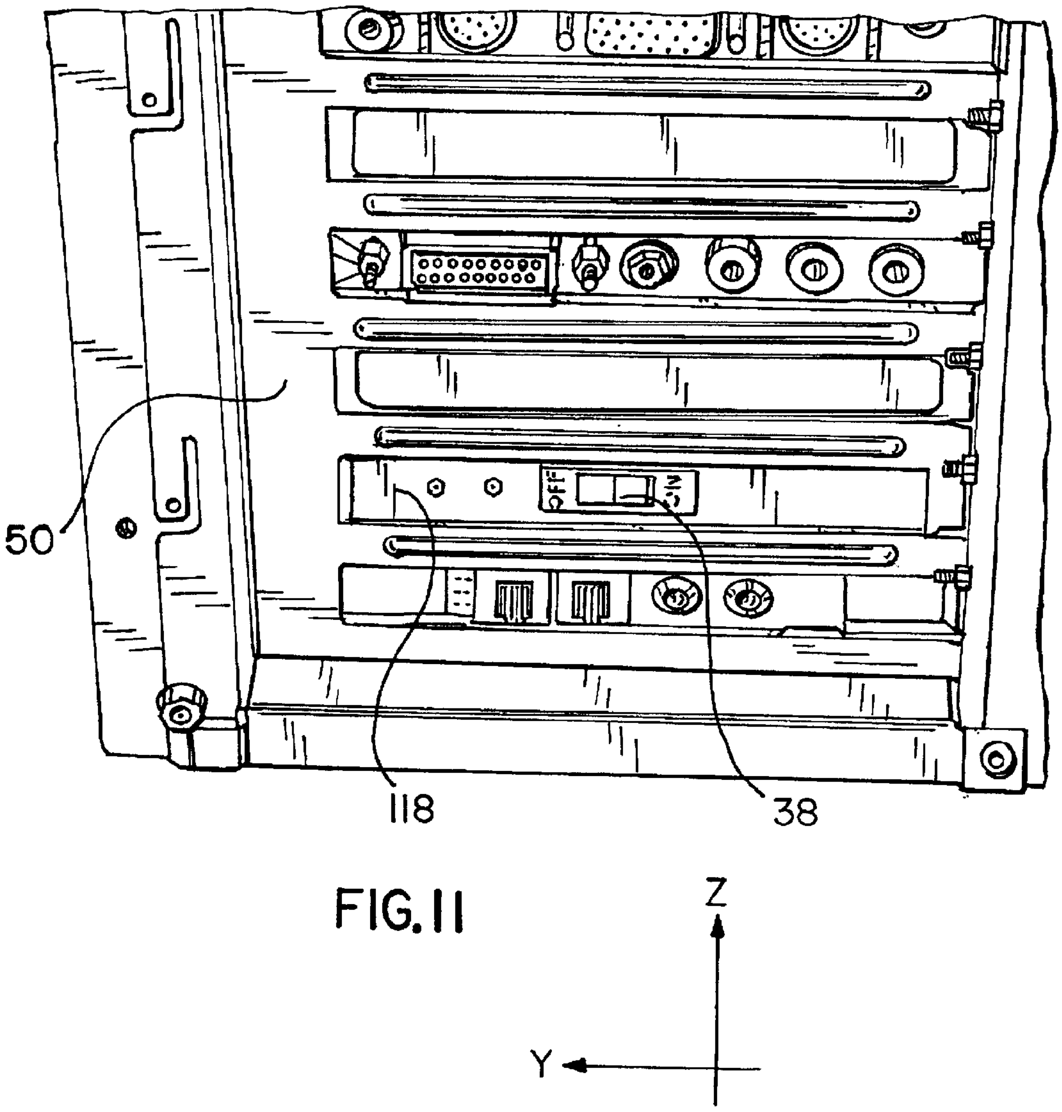
FIG. 11 is a side view, similar to that of FIG. 8, showing the external appearance of the inventive device after insertion has been accomplished in the manner shown in FIGS. 9 and 10.

The manner of usage of the device of FIGS. 4 to 8 is shown in FIGS. 9 and 10. More particularly, in FIG. 9 is shown the insertion of tapered end 26 of bracket 118 into void space 46 (see also FIG. 2) that is created by the removal of the original or installation ESC bracket 18 therefrom. Accordingly, said bracket 118, inclusive of its integral battery pack 32, is slid forward in the +y direction until it has reached complemental slot 28 of wall 30. The device, when fully installed within said void space, is shown in FIG. 10. It is therefrom to be appreciated that, after installation of the present battery powered lamp assembly, which has been integrated into bracket 118, and its securement within said void space 46 by the re-insertion and securement of screw 24 against bracket surface 21, the computer (when a cover thereof is removed) is provided with an internal light which, by the actuation of switch 38 (see FIG. 11), is accessible from an outside −x sidewall 50 of the computer, to provide essential illumination to PC owners and technicians working upon the inside of a computer.

It is to be appreciated that in other models or a PC structure than that shown in FIGS. 1, 2, 4, 5 and 10, all inside components will typically be rotated by 90 degrees about the y-axis, such that expansion cards 14 are vertical and the planes of surfaces 34/36 of the ESC type brackets are horizontal. However, in all other respects, the use of the device shown in FIGS. 4 to 8 is the same in either type of computer.

Further, in the preferred embodiment, the length of flexible neck 40 will be in a range of 12 to 24 inches long. It may, thereby, be appreciated that a lamp having a flexible neck or considerable length may typically be stored within space available inside of most personal computers.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

We claim:

1. A device for the illumination of an interior of a case of a personal computer, comprising:

(a) a base bracket for attaching said device, to an inside of said computer case, said base bracket having the general geometry of an expansion slot cover bracket; wherein said base bracket can be inserted and secured to a space for said expansion slot cover bracket on a rear wall of said computer case, thereby positioning said device inside said computer case;

(b) self-contained power means and a housing thereof secured to at least one surface of said base bracket; said power means providing electricity to said device independent of a power supply of said computer;

(c) a flexible lamp neck having one end thereof extending from said housing of said power means and in electrical communication with said power means;

(d) a lamp in electrical communication with an opposite end of said lamp neck; and (e) switch means in electrical communication with said power means.

2. The device as recited in claim 1, wherein said base bracket has an opening, and said switch means extends out from said opening and is accessible from outside of said rear wall of said computer case.

3. The device as recited in claim 2, wherein said lamp further comprises a heat shield.

4. The device as recited in claim 2, wherein said flexible lamp neck has a length from 12 to 24 inches.

5. The device as recited in claim 2, wherein said power means comprises a battery.

6. The device as recited in claim 5, wherein said battery is rechargeable.

7. A method of providing illumination to the inside of a case of a personal computer during periods of work with the hardware thereof, the method comprising the steps of:

(a) removing a pre-existing expansion slot cover bracket from a rear wall of said computer;

(b) inserting a base bracket of a lamp means into a void space generated from step (a) thereby positioning said lamp means inside of said computer case, wherein said lamp means comprises said base bracket having a substantial geometry of said expansion slot cover bracket; self-contained power means having a housing secured to one surface of said base bracket, said power means providing electricity to said lamp means independent of a power supply of said computer; and a switch means; a lamp; and a flexible lamp neck having one end thereof extending from said housing and an opposite end connected to said lamp;

(c) fastening said base bracket to said rear wall; and (d) activating said lamp means by said switch means to provide lighting inside said computer case.

8. The method as recited in claim 7, wherein said base bracket has an opening, and said switch means extends out from said opening; thereby said activating said lamp means can be performed from outside of said real wall of said computer case.

9. The method as recited in claim 7 further comprising the step of securing said base bracket at a transverse outer end thereof to said real wall of said computer.

10. A device for the illumination of an interior of a case of a personal computer, comprising:

(a) a base bracket for attaching said device to an inside of said computer case, said base bracket having the general geometry of an expansion slot cover bracket and an opening around a center of said base bracket; wherein said base bracket can be inserted and secured to a space for said expansion slot cover bracket on a rear wall of said computer case, thereby positioning said device inside said computer case;

(b) power means and a housing thereof secured to an inner surface of said base bracket;

(c) a flexible lamp neck having one end thereof extending from said housing of said power means and in electrical communication with said power means;

(d) a lamp in electrical communication with an opposite end of said lamp neck; and (e) switch means connected to said power means, said switch means extending out from said opening of said base bracket and being accessible from outside of said rear wall of said computer case.

11. The device as recited in claim 10, wherein said lamp further comprises a heat shield.

12. The device as recited in claim 11, wherein said flexible lamp neck has a length from 12 to 24 inches.

13. The device as recited in claim 12, wherein said power means comprises a battery.

14. The device as recited in claim 13, wherein said battery is rechargeable.

* * * * *